(12) United States Patent
Suri et al.

(10) Patent No.: US 8,407,158 B2
(45) Date of Patent: Mar. 26, 2013

(54) SYSTEM AND METHOD FOR PROVIDING INTERACTIVE TROUBLESHOOTING

(75) Inventors: Syam S. Suri, Wesley Chapel, FL (US); Mukesh Kumar, Tampa, FL (US); Ravi S. Guduru, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 752 days.

(21) Appl. No.: 12/233,637

(22) Filed: Sep. 19, 2008

(65) Prior Publication Data
US 2010/0076909 A1    Mar. 25, 2010

(51) Int. Cl.
  *G06F 17/00* (2006.01)
  *G06N 5/00* (2006.01)
(52) U.S. Cl. ............................. 706/11; 709/218; 370/329
(58) Field of Classification Search ..................... 706/11
See application file for complete search history.

(56) References Cited

U.S. PATENT DOCUMENTS

| | | | | |
|---|---|---|---|---|
| 2001/0049688 | A1* | 12/2001 | Fratkina et al. | 707/104.1 |
| 2004/0073558 | A1* | 4/2004 | Schrijvers et al. | 707/100 |
| 2007/0203863 | A1* | 8/2007 | Gupta et al. | 706/20 |

* cited by examiner

*Primary Examiner* — Kakali Chaki
*Assistant Examiner* — Kalpana Bharadwaj

(57) ABSTRACT

An approach provides interactive troubleshooting. A robotic chat application receives a service inquiry over a chat session from a chat-enabled device, wherein the service inquiry is associated with a service provider network. A troubleshooting engine collects information from a user of the chat-enabled device regarding the service inquiry. The robotic chat application retrieves a flow definition and an associated query corresponding to the service inquiry based upon the collected information. The troubleshooting engine generates a command, based on the query, for resolving the service inquiry.

18 Claims, 8 Drawing Sheets

SYSTEM AND METHOD FOR PROVIDING INTERACTIVE TROUBLESHOOTING

BACKGROUND INFORMATION

In today's highly competitive telecommunications industry, service providers provide customer's with a wide variety of voice, data, video, and internet services. Because of the complexity of service provider network systems and consumer premise equipment being deploying in the field to provide such services, service providers must utilize highly trained technicians to install and fix problems with the consumer premise equipment. However, such technicians inevitably encounter problems that require assistance.

Typically, service providers utilize call centers that have trained personnel to assist the technicians by answering calls from technicians and performing the analysis of the problem and providing the technician with a proposed solution. Due to the complexity of the systems involved, such call centers may receive a very large number of support calls from technicians in the field installing such products. Such calls can be costly in terms of time and resources needed to train the personnel answering the calls from technicians, and in terms of the time and resources utilized by employing such trained personnel.

Therefore, there is a need for an approach that provides a troubleshooting system that can allow the technician to interact with the system to troubleshoot and solve the problem.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENTS

A preferred apparatus, method, and software for providing interactive troubleshooting are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
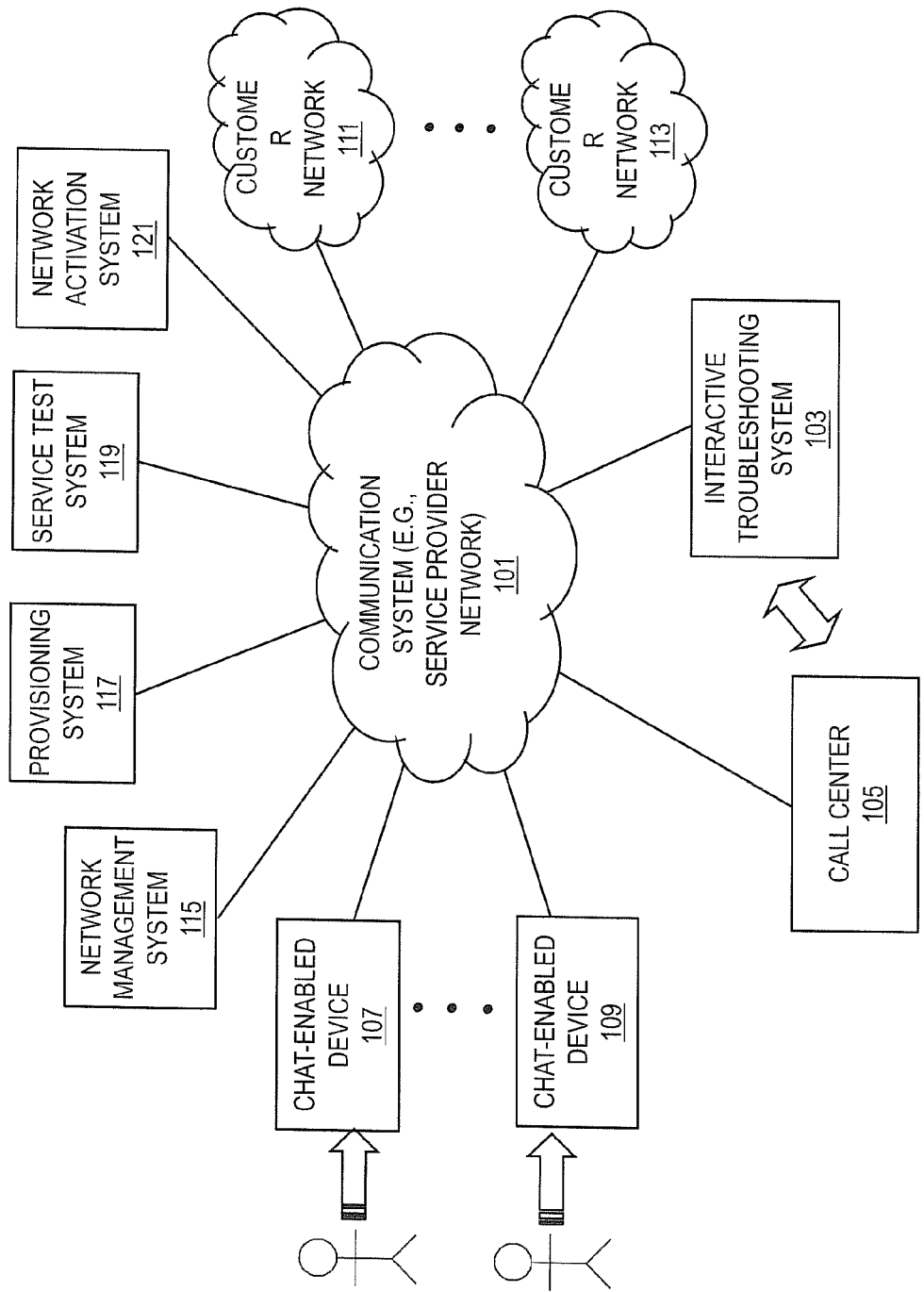
FIG. 1 is a diagram of an interactive troubleshooting system utilizing a chat interface to retrieve flow definitions for resolving problems, according to an exemplary embodiment.

FIG. 1 is a diagram of an interactive troubleshooting system utilizing a chat interface to retrieve flow definitions for resolving problems, according to an exemplary embodiment. A communication system 101 includes an interactive computer system, also referred to herein as an interactive troubleshooting system 103, and call center 105 for providing support services. For example, assuming the communication system 101 is associated with a service provider for providing telecommunication services, this system 101 permits users (e.g., field technicians) to access the interactive troubleshooting system 103 using chat-enabled devices 107, 109. The chat-enabled devices 107, 109 may be mobile computing devices, such as a cellular phone, radiophone, satellite phone, smart phone, wireless phone, or any other suitable mobile device, such as a personal digital assistant (PDA), pocket personal computer, tablet, customized hardware, etc. According to an embodiment, these devices 107, 109 can execute an instant communications client (or chat client) to communicate with a robotic chat application which automatically utilizes flow definitions corresponding to troubleshooting scenarios. For example, technicians using chat-enabled devices 107, 109 can, in real-time while out in the field, seek resolution of service inquiries (e.g., problematic provisioning activities) pertaining to customer networks 111, 113, etc. Thus, during initialization of a customer's service (e.g., during installation of customer premise equipment, etc.), or during service calls to fix problems with a customer's service or to make changes to a customer's service, a technician can contact either the interactive troubleshooting system 103 or the call center 105 to help establish communication between the customer network and the service provider network 101 or to troubleshooting problems encountered by the technician.

Traditionally, technicians would contact the call center 105 to obtain help with troubleshooting problems from live agents or operators. That is, these personnel would answer calls from the technicians and perform analysis of the problem to provide the technician with a proposed solution. Because of the complexity of service provider network systems and consumer premise equipment (CPE) being deployed in the field, such call centers would typically receive a very large number of support calls from technicians in the field installing such products. These calls can be costly in terms of the required number of trained personnel for servicing the technicians.

In recognition of the above shortcomings, the interactive troubleshooting system 103 provides an automated service inquiry (e.g., problems relating to installation, service, etc.) resolution mechanism, whereby a robotic chat application is employed. This robotic chat application operates with a database of flow definitions for interacting with technicians in the field to solve their provisioning problems preferably without human interaction. This system can thus reduce the call volume from field technicians to the call center 105, and thus minimize the overhead costs for operating such a call center as well as increase the overall efficiency of the provisioning and troubleshooting processes.

According to one embodiment, the interactive troubleshooting system 103 can communicate with a network management system 115, a provisioning system 117, a service test system 119, and a network activation system 121. The interactive troubleshooting system 103 can have access to the various systems 115, 117, 119, and 121 in order to gather information during troubleshooting and to test and correct problems. For example, the interactive troubleshooting system 103 can access the network management system 115 and/or the provisioning system 117 to collect information regarding the customer network(s) and the services that the customer network currently has or has ordered (e.g., customer telephone or account number that can be used to retrieve customer information via network databases, etc.). Also, the interactive troubleshooting system 103 can access the service test system 119 to conduct tests on the system to aid in troubleshooting problems, and can access the network activation system 121 to help the technicians during, for instance, installation and initiation of services for the customers.

Figure 2:
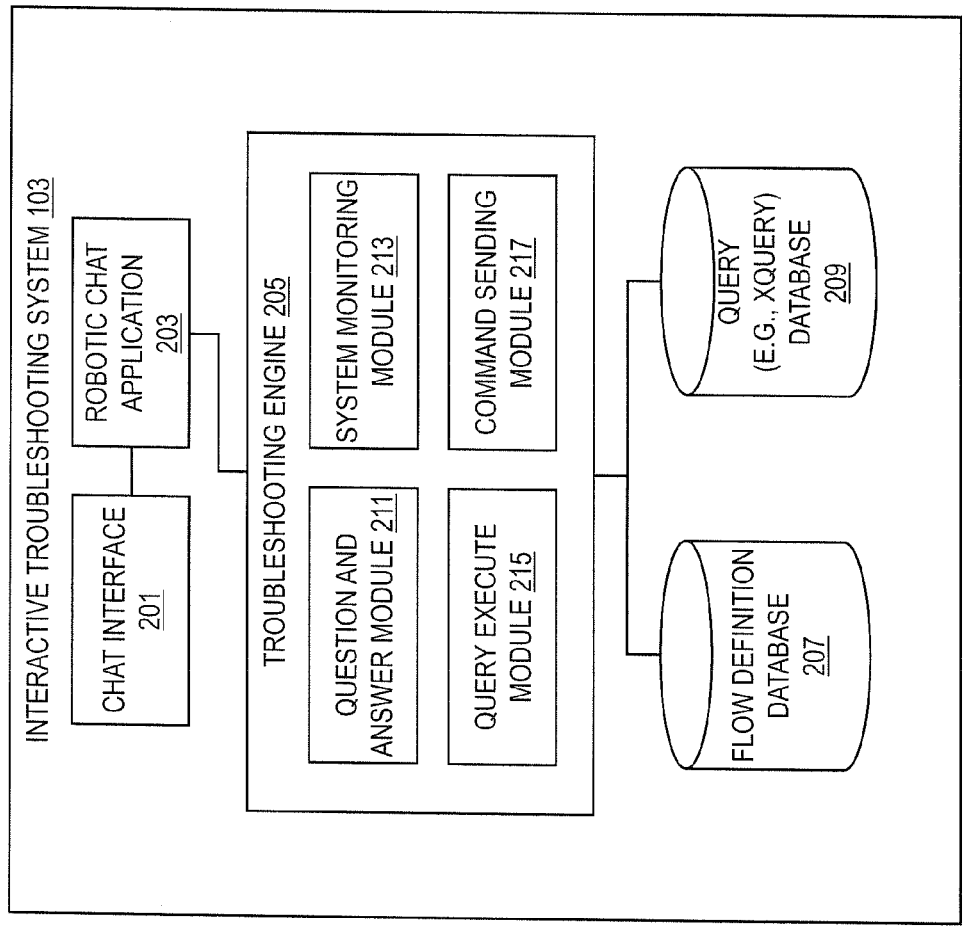
FIG. 2 is a diagram of the interactive troubleshooting system of FIG. 1 employing a robotic chat application, according to an exemplary embodiment.

FIG. 2 is a diagram of an interactive troubleshooting system capable of providing interactive troubleshooting of problems encountered by technicians installing or servicing customer networks, according to an exemplary embodiment. In this embodiment, the interactive troubleshooting system 103 includes a chat interface 201, a robotic chat application 203, a troubleshooting engine 205, a flow definition database 207, and a query database 209. The chat interface 201 allows a technician to access the interactive troubleshooting system from any number of platforms, such as devices 107 and 109, in real-time or near real-time. The interface 201 is used to conduct chat sessions with the users. Chat sessions, as used herein, can also be referred to as instant messaging (IM) sessions or instant communication sessions. The technician utilizes the chat-enabled devices 107, 109 to contact the robotic chat application 203 via the chat interface 201. Upon contact by the technician via the chat interface 201, the robotic chat application 203 initiates a robotic chat session that will be used to provide a variety of services, such as provisioning, trouble-ticket handling, technical support, accounting, etc. The robotic chat application 203 can gather information from the technician (e.g., by posing questions to the technician) that will be used by the troubleshooting engine 205. Also, the robotic chat application 203 communicate proposed solutions to the technician, as formulated by the troubleshooting engine 205.

The troubleshooting engine 205 includes a question and answer module 211, a system monitoring module 213, a query execute module 215, and a command sending module 217. The troubleshooting engine 205 has access to the flow definition database 207 and the query database 209, as well as to the various components of the service provider network 101, such as the network management system 115, the provisioning system 117, the service test system 119, and the network activation system 121.

In one embodiment, the queries generated by the module 215 to the database 209 are in form of an XQuery, which is a structured query language (SQL). XQuery provides the capability to generate queries of eXtensible Mark-up Language (XML) data. Although the system query execute module 215 and query database 209 are described with respect to XQuery, it is contemplated that other query languages can be utilized.

Figure 3:
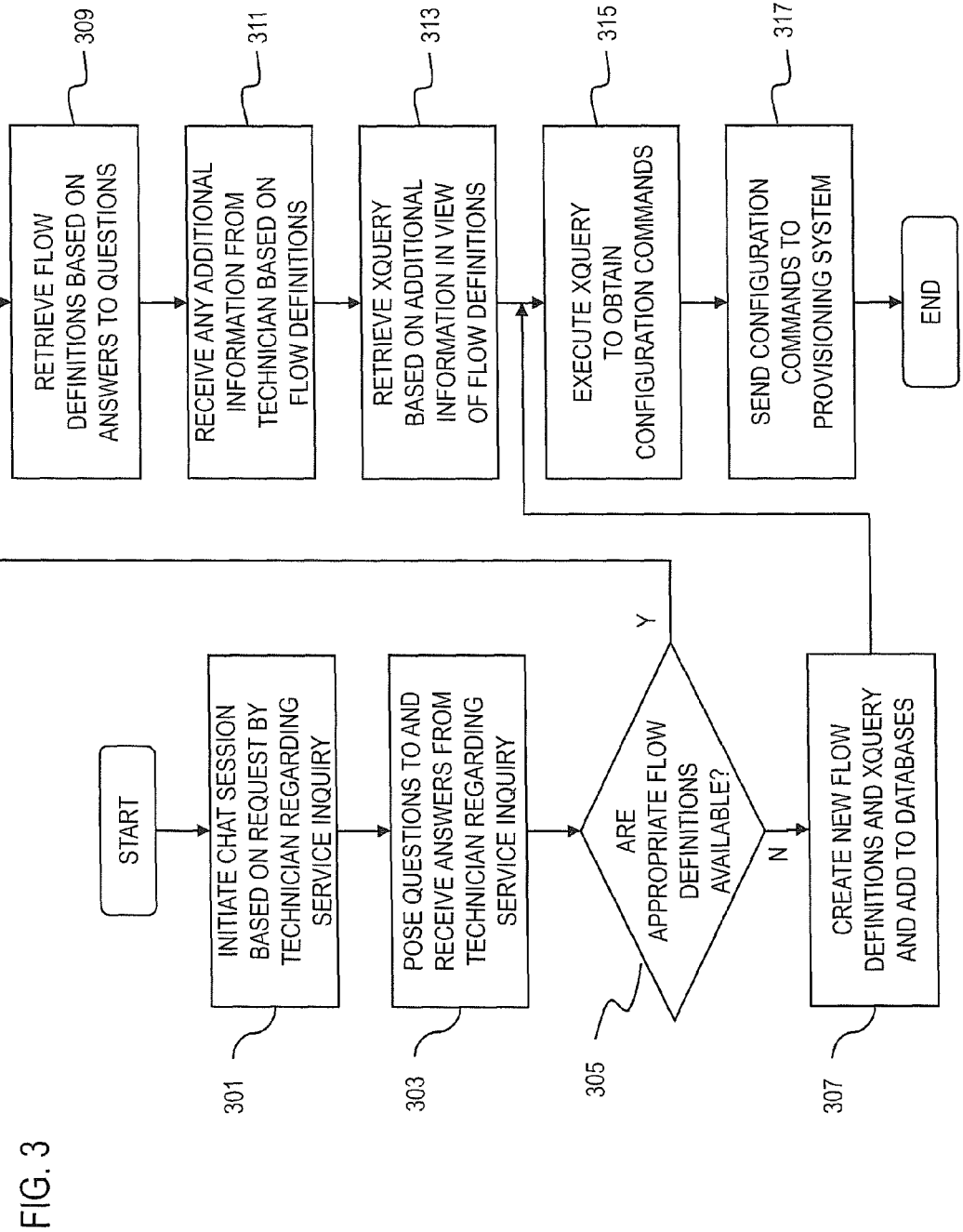
FIG. 3 is a flowchart of a process for performing troubleshooting via a chat-enabled device to communicate with an interactive troubleshooting system, according to an exemplary embodiment.

FIG. 3 is a flowchart of a process for performing troubleshooting of a problem encountered by a technician, according to an exemplary embodiment. As can be seen in FIG. 3, a chat session is initiated based on a request by the technician in step 301. Thus, for example, a technician will remotely connect to the interactive troubleshooting system 103 using a chat-enabled device 107 (e.g., laptop computer, telephone, or other communication device), and the chat interface 201 will provide an interface for interaction with the robotic chat application 203. The robotic chat application 203 will receive the request from the technician to initiate a chat session regarding a service inquiry. Such inquiry can relate to a problem with provisioning or service, for instance.

Once the chat session is initiated, in step 303, the question and answer module 211 will pose questions to and receive answers from the technician regarding the problem encountered or the process the technician wants to perform. Alternatively, other methods for collecting data pertaining to the service inquiry can be utilized. The system monitoring module 213 can retrieve information regarding the particular customer network under consideration, and can check various network settings, connections, etc., by communicating with the network management system 115, the provisioning system 117, the service test system 119, and the network activation system 121. Thus, the question and answer module 211, in conjunction with the information received by the system monitoring module 213 and the answers provided by the technician via the chat interface 201, can pose any additional question needed or a series of questions in order to narrow down the type of problem being encountered. The question and answer module 211 can also provide the technician with various menus of options via which the technician can request help, for example, regarding testing or initiation of a customer's service.

Based on the answers provided by the technician to the questions posed by the question and answer module 211 and based on the information retrieved by the system monitoring module 213 during the chat session, the robotic chat application 203 will determine whether there are appropriate flow definitions available for the present situation, in step 305. The robotic chat application 203 will thus check the flow definition database 207 to determine if an appropriate flow definition is available. If it is determined that no such flow definition is available (e.g., if this is an uncommon problem for which a flow definition has not yet been defined), then a new flow definition and corresponding query (e.g., xquery) will need to be created and added to their respective databases, as in step 307. In order to create such new flow definitions and xqueries, it may be necessary to utilize the services of the call center 105 in order to research and resolve the service inquiry. If, however, it is determined that an appropriate flow definition is available, then the process proceeds to step 309.

In step 309, the appropriate flow definition is retrieved from the flow definition database 207, based on the answers that the technician provided to the questions posed in step 303, and possibly also based on information gathered by the system monitoring module 213. The flow definition may also include one or more questions that are posed to the technician in order to gather additional information from the technician as needed by the flow definition, in step 311. Once the technician has successfully navigated all the flow definitions in step 311, then the robotic chat application 203 retrieves an xquery, in step 313, from the xquery database 209.

The xquery retrieved in step 313 or created in step 307 can be executed by the xquery execute module 215 to obtain configuration commands in step 315. When the xquery is executed, then the command sending module 217 sends configuration commands to the provisioning system 117 (or other appropriate network component, such as, the network management system 115, the service test system 119, the network activation system 121, etc.), in step 317, in order to correct the problem, or initiate or test the service.

The interactive troubleshooting system 103 thereby provides an interactive robotic chatting session for the technicians, where all the technicians need to do is answer the questions posed. The system 103 provides a solution in a generic format that can be implemented by the various network components without the need for making computer code changes to implement such solutions. For example, the system uses xqueries to generate an XML that is sent to the network component (or service system), and the system can be provided with graphical user interfaces that allow administrative personnel to change the xquery format if necessary. Any change to the interface between the service and system is generic, which thereby eliminates very expensive code changes when the service needs to be changed. It is noted that other standard database languages instead of xquery can be used if desired.

The robotic chat application 203 asks a series of questions of the technician, generates a workflow to activate the xquery to reconfigure the system, and thus uses the xquery to control the flow and configuration to resolve a particular issue. When something needs to be added to the process, the process can simply be modified by adding a question to the flow definition and associating the new xquery with the new question and answer.

The whole flow process of the interactive troubleshooting system 103 advantageously utilizes a generic interface that can be used to be interactive with various client systems. For example, the chat interface 201 can communicate with chat clients of any type and running on any type of system (e.g., web client systems, text-to-speech interactive voice response (IVR) systems, mobile wireless client systems, etc.).

The interactive troubleshooting system can advantageously utilize existing provisioning systems to reduce or eliminate the need to modify such systems, and which ensures that problems are being solved in the proper manner.

Thus, the interactive troubleshooting system is totally configurable. The system can process flow definitions and function calls can be configured without any code change, thus eliminating the dependency on release schedules. The system is also plug-and-play. No restrictions are provided on interface format. Any function available in the systems can be plugged-in to define a step-by-step flow definition to provide interactive solution to complex problems. Also, the system is polymorphic. The system is compatible with a variety of clients (e.g., chat clients, voice portals, mobile devices, etc.). Once the process flow is defined, the system can be invoked from any type of client.

Figure 4:
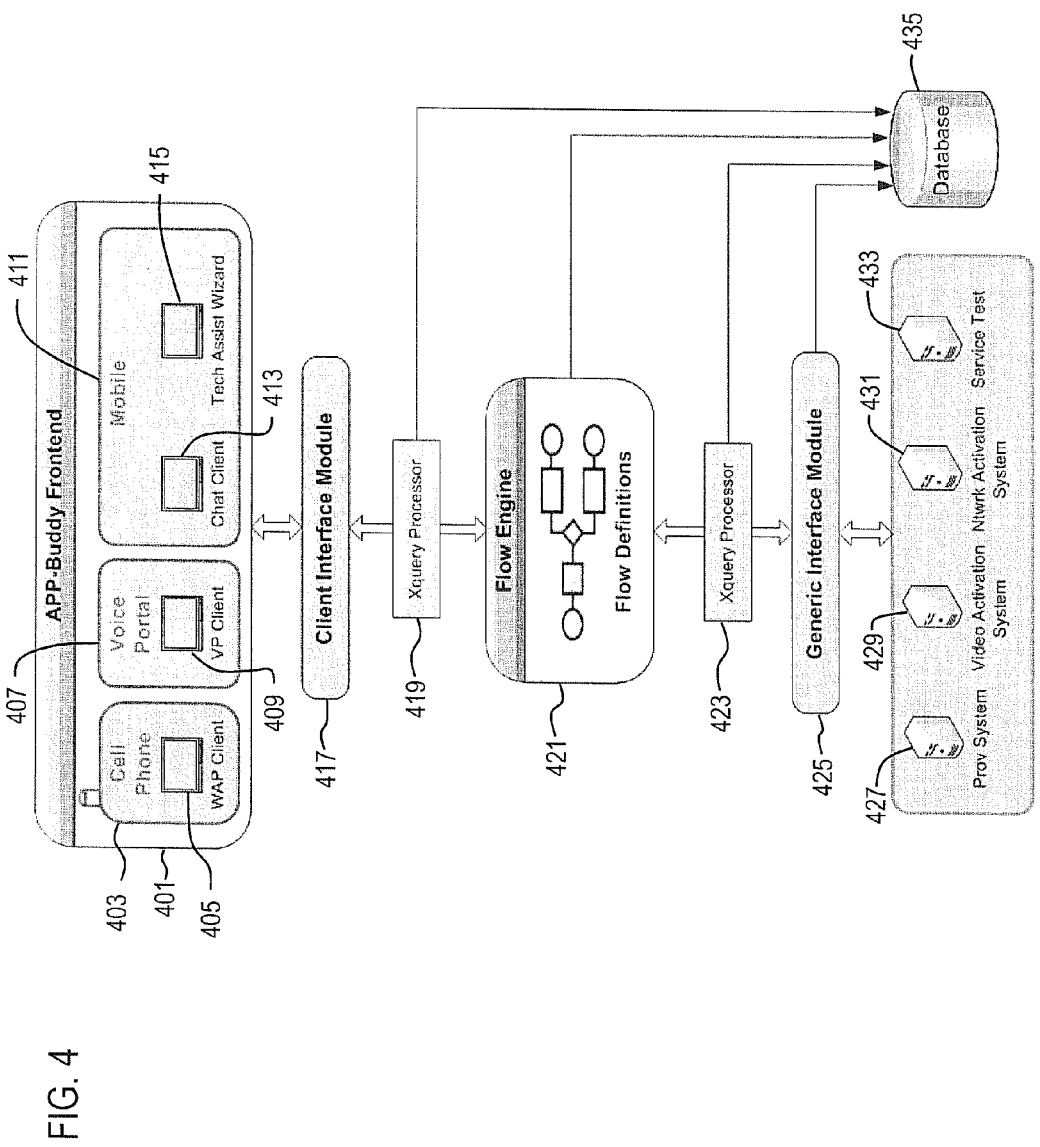
FIG. 4 is a schematic view of an interactive troubleshooting system, according to another exemplary embodiment.

FIG. 4 is a schematic view of an interactive troubleshooting system, according to another exemplary embodiment.

The system shown in FIG. 4 includes an application buddy frontend 401, which includes several different clients or chat-enabled devices (e.g., similar to chat-enabled devices 107 and 109 in FIG. 1) that can be used to access and utilize the interactive trouble shooting system. For example, a cell phone 403 with a wireless application protocol (WAP) client 405 can be used, a voice portal 407 with a voice protocol (VP) client 409 can be used, and a mobile device 411 (e.g., a laptop computer, handheld device, etc.) with a technician assistance application or wizard 415 can be used.

A generic client interface module 417 (e.g., similar to chat interface 201 and/or robotic chat application 203 in FIG. 2) is defined to support interactive dialog between the system and the user (e.g., technician in the field). Different types of client programs such as chat client, voice portal or mobile device programs that implement this interface definition can provide the interactive troubleshooting.

An XQuery processor 419 (e.g., similar to the questions and answer module 211 in FIG. 2) executes the predefined XQuery transformations for client interactions in each step in the process flow and sends the resultant xml to the client system.

Process steps for the troubleshooting scenarios are defined in the form of a flow definition in the system. When the user launches the interactive troubleshooting for a scenario, a flow engine 421 creates an instance of the flow definition and moves through the steps as per the logic defined in the flow definition.

An XQuery processor 423 (e.g., similar to the query execute module 215 in FIG. 2) executes the predefined XQuery transformations for external interfaces in each step in the process flow and sends the resultant xml to the external system.

A generic interface module 425 (e.g., similar to the command sending module 217 in FIG. 2) is combined with the XQuery processor 423 to provide the ability to interface with any system that needs to be called in a process flow definition, for example a provisioning system 427, a video activation system 429, a network activation system 431, a service test system 433, etc.

The XQuery processor 419, the flow engine 421, the XQuery processor 423, and the generic interface module 425 can interact with database 435 (e.g., similar to databases 207 and 209 in FIG. 2).

Figure 5A:
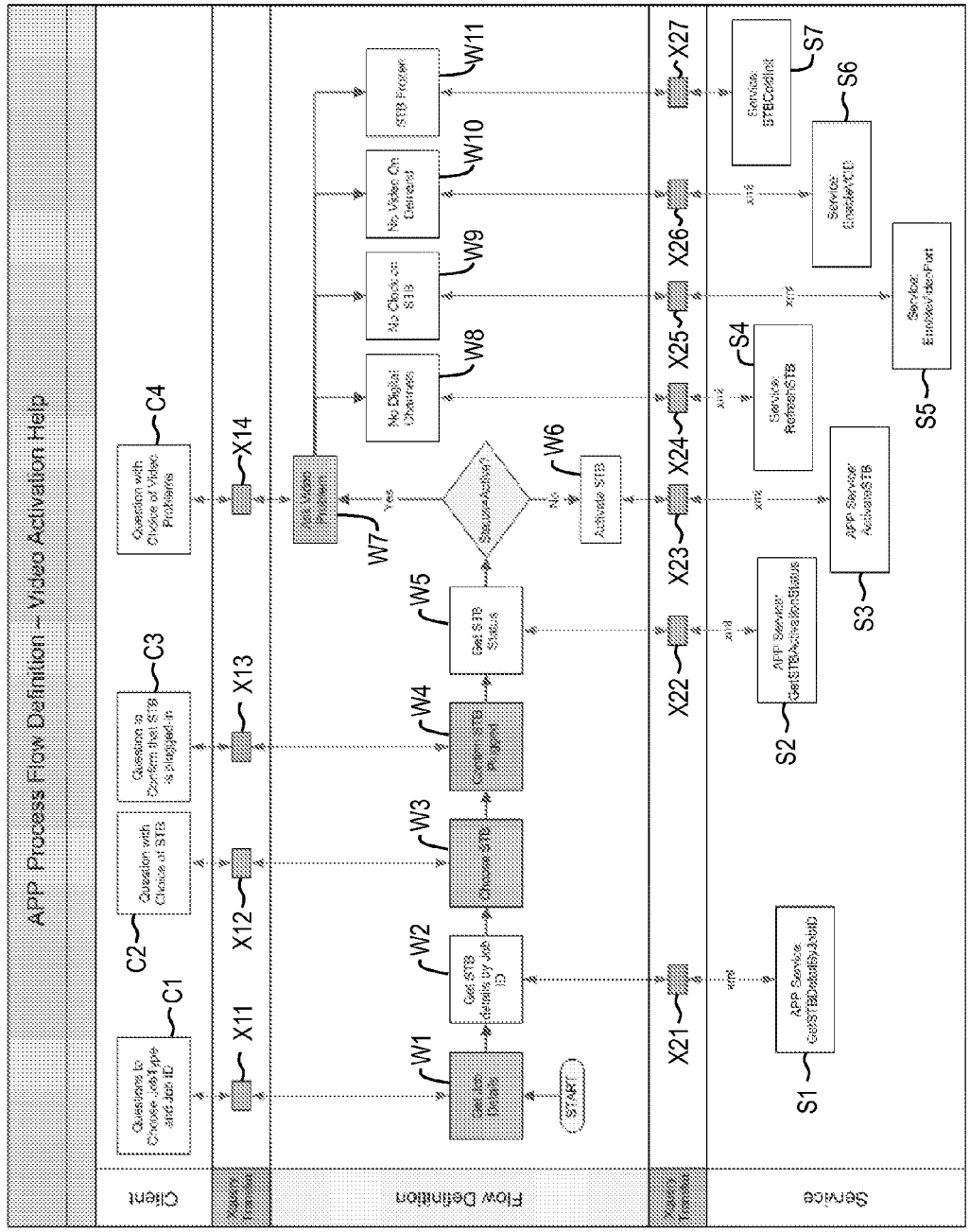
FIG. 5A is process flow diagram for the interactive troubleshooting system shown in FIG. 4.
Figure 5B:
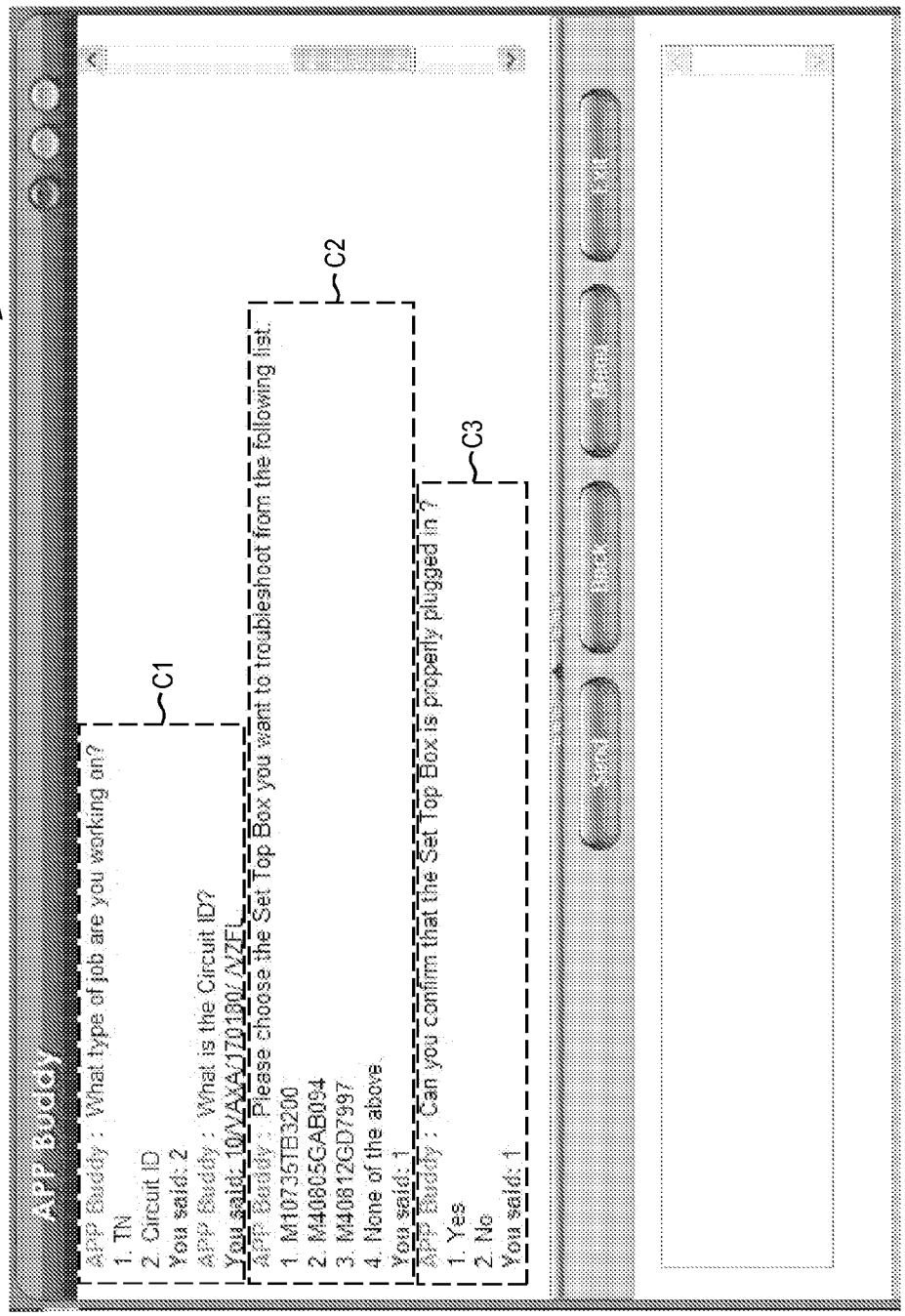
FIG. 5B is a screenshot of a user interface for a technician using the interactive troubleshooting system shown in FIG. 4 during a first portion of the process flow diagram in FIG. 5A.
Figure 5C:
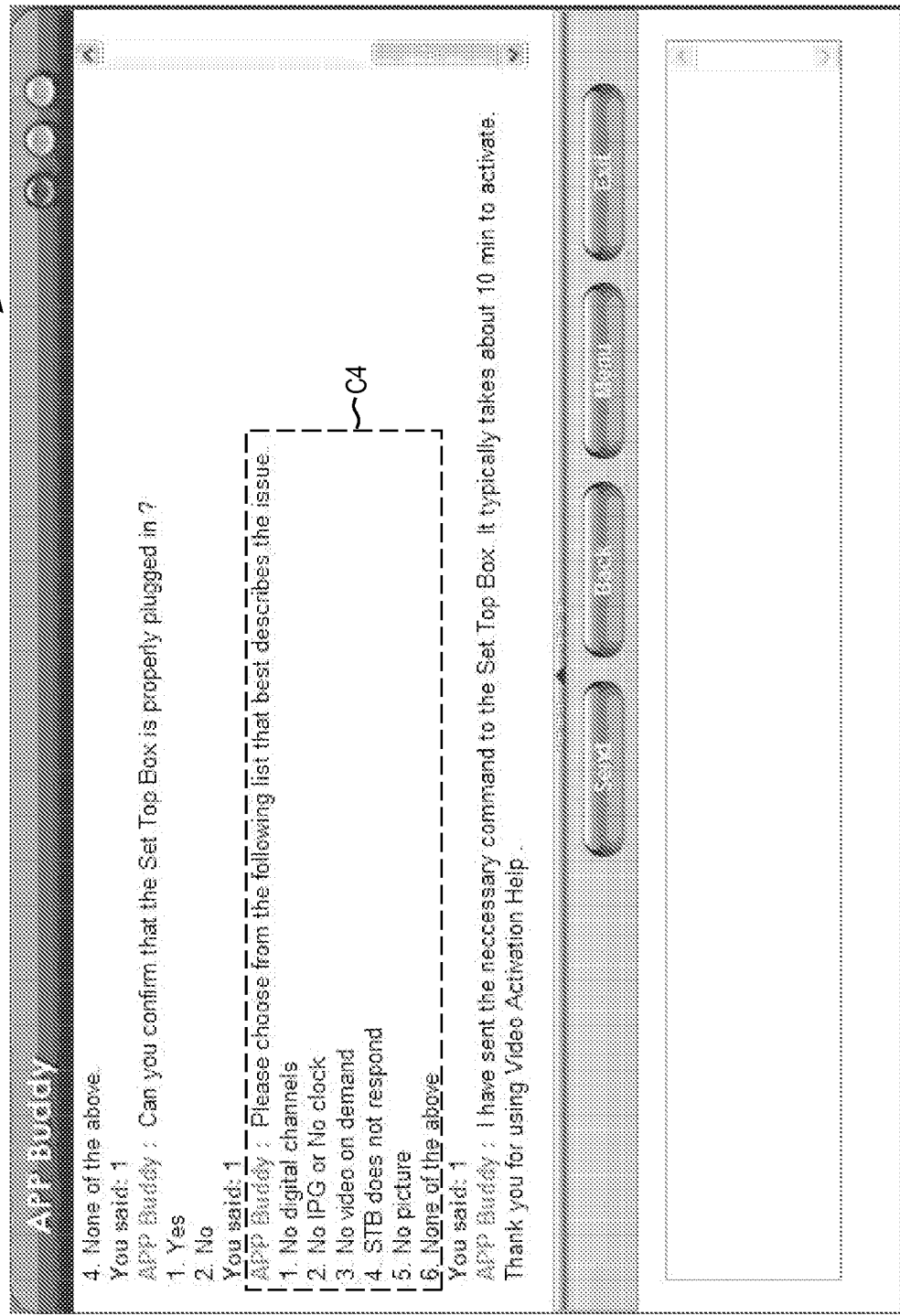
FIG. 5C is a screenshot of a user interface for a technician using the interactive troubleshooting system shown in FIG. 4 during a second portion of the process flow diagram in FIG. 5A.

FIG. 5A is process flow diagram for the interactive troubleshooting system shown in FIG. 4, FIG. 5B is a screenshot of a user interface for a technician using the interactive troubleshooting system shown in FIG. 4 during a first portion of the process flow diagram in FIG. 5A, and FIG. 5C is a screenshot of a user interface for a technician using the interactive troubleshooting system shown in FIG. 4 during a second portion of the process flow diagram in FIG. 5A.

FIG. 5A is an example flow definition that will be used to describe the system flow of interactive troubleshooting engine. Note that "STB" used therein refers to set top box.

Process steps for the troubleshooting scenarios are defined in the form of a flow definition in the system. Flow logic that connects boxes W1-W11 represents the flow definition. Each step is identified as either a client or server interaction step depending on the interaction type. In the flow definition section in FIG. 5A, boxes W1, W3, W4, and W7 are client steps, and boxes W2, W5, W6, and W8-W11 are server steps.

An XQuery transformation is defined for each step to generate the necessary xml that needs to be sent. Boxes X11-X14 are the XQuery transformations that generate interactive questions for corresponding client steps. Boxes X21-X27 are the XQuery transformations for server steps to call the functions in the external systems.

All these XQuery transformations are stored in the database 435. When user launches interactive troubleshooting for a scenario at the buddy frontend 401, the flow engine 421 creates an instance of the flow definition and executes the transformation associated with each step and moves through the steps as per the logic defined in the flow.

X11 is the XQuery transformation for client step W1. When XQuery processor 419 executes X11 transformation associated with work step W1, the result is a set of questions that will be sent to the client program as shown in FIG. 5B as highlighted box C1 shown on a display screen 500. Similarly, other work steps, such as work steps W3, W4, and W7, result in questions at client steps C2-C4, respectively, as shown in FIGS. 5A-5C. Also, when XQuery processor 423 executes X21 transformation associated with work step W2, the result is a service step S1 as shown in FIG. 5A. Similarly, other work steps, such as work steps W5, W6, and W8-W11, result in service steps S2-S7, respectively.

In this manner, when the flow engine 421 runs from step W1 through step W11, it results in an interactive troubleshooting solution as shown in FIGS. 5A-5C.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
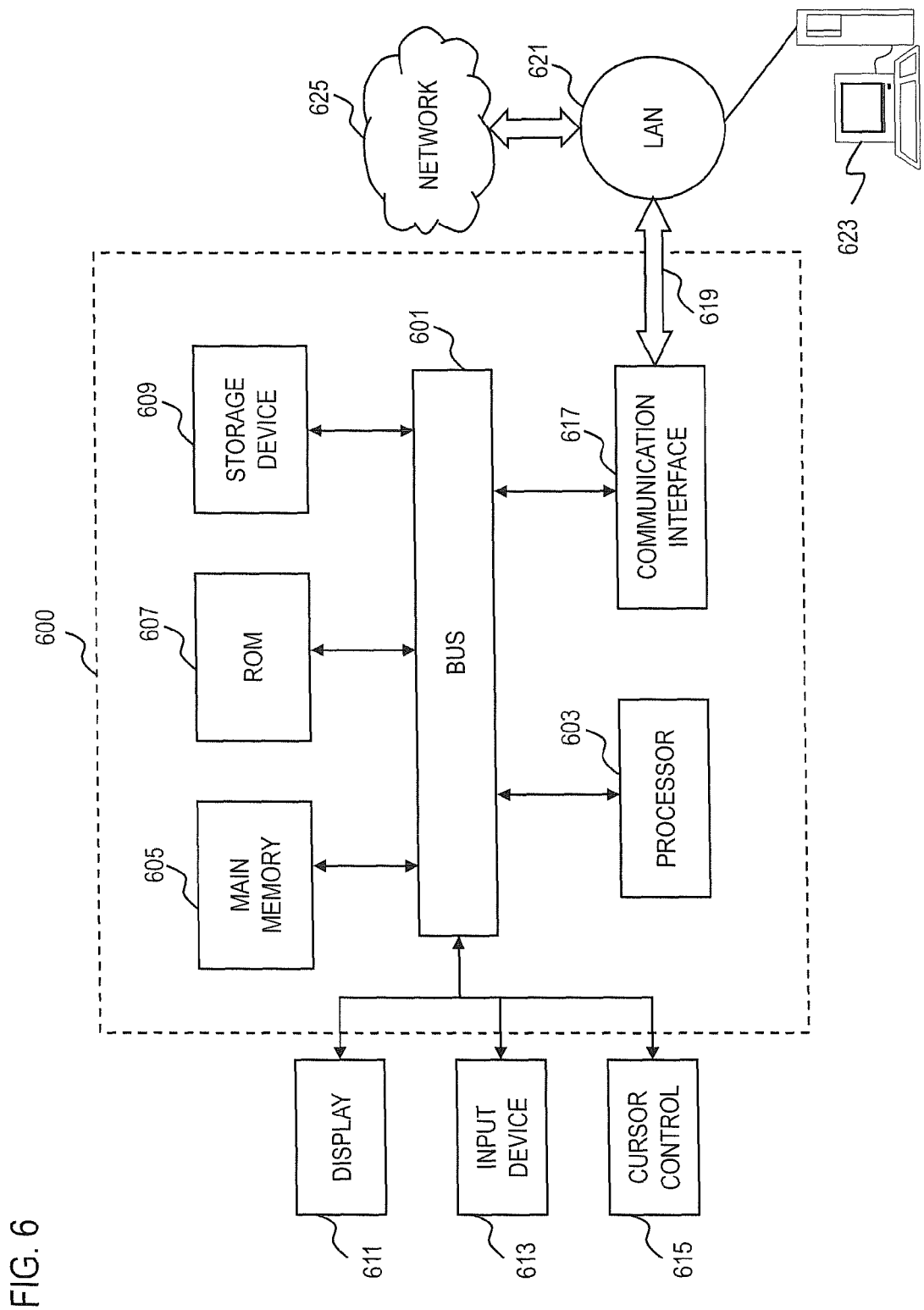
FIG. 6 is a diagram of a computer system that can be used to implement various exemplary embodiments.

FIG. 6 illustrates computing hardware (e.g., computer system) 600 upon which an embodiment according to the invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A system comprising:
   at least one processor; and
   at least one memory including computer program code,
   the at least one memory and the computer program code configured to, with the at least one processor, cause the system to perform at least the following,
   store in a first database a plurality of flow definitions relating to a plurality of service inquiries, wherein the flow definitions comprise logic connecting client steps and server steps corresponding to troubleshooting scenarios for the plurality of service inquires;
   store in a second database a plurality of queries associated with the plurality of flow definitions; implement
   implement a robotic chat application configured to receive a service inquiry over a chat session from a chat-enabled device, wherein the chat-enabled device comprises a client and the service inquiry is associated with a service provider network; and
   implement a troubleshooting engine configured to collect information from a user of the chat-enabled device regarding the service inquiry, the robotic chat application being further configured to retrieve from the first database a flow definition and from the second database an associated query corresponding to the service inquiry based upon the collected information,
   wherein once all flow definitions corresponding to a particular troubleshooting scenario corresponding to the service inquiry have been navigated, the robotic chat application retrieves the associated query,
   wherein the troubleshooting engine is further configured to generate a command, based on the associated query, for resolving the service inquiry, and
   wherein any function regarding a service inquiry is available to define a step-by-step flow definition.

2. The system according to claim 1, wherein said troubleshooting engine further includes a system monitoring module configured to monitor one or more components of the service provider network, and wherein said system monitoring module is configured to gather information regarding a customer network.

3. The system according to claim 2, wherein said system monitoring module is configured to monitor a network management system, a provisioning system, a service test system, a network activation system, or a combination thereof.

4. The system according to claim 1, wherein said troubleshooting engine further includes a query execute module configured to execute the query, wherein the query complies with an xquery format.

5. The system according to claim 4, wherein said troubleshooting engine further includes a command sending module configured to send the command to a component of the service provider network based upon the executed xquery.

6. The system according to claim 5, wherein said command sending module is configured to send the command to a network management system, a provisioning system, a service test system, a network activation system, or a combination thereof.

7. The system according to claim 1, wherein said troubleshooting engine is configured to pose one or more questions to the user and to analyze the service inquiry based upon answers received from the user in response to the questions during said chat session.

8. A method comprising:
   receiving a service inquiry over a robotic chat session from a chat-enabled device, wherein the service inquiry is associated with a service provider network;
   collecting information from a user of the chat-enabled device regarding the service inquiry;
   retrieving a flow definition from a first database based upon the collected information, wherein
   the first database is configured to store a plurality of flow definitions relating to a plurality of service inquiries,
   a second database is configured to store a plurality of queries associated with the plurality of flow definitions,
   the flow definitions comprise logic connecting client steps and server steps corresponding to troubleshooting scenarios for the plurality of service inquires, and
   the chat-enabled device comprises a client;
   once all flow definitions corresponding to a particular troubleshooting scenario corresponding to the service inquiry have been navigated, retrieving the associated query corresponding to the service inquiry; and
   generating a command, based on the associated query, for resolving the service inquiry,
   wherein any function regarding a service inquiry is available to define a step-by-step flow definition.

9. The method according to claim 8, further comprising:
   monitoring one or more components of the service provider network; and gathering information regarding a customer network.

10. The method according to claim 9, wherein the one or more components monitored include a network management system, a provisioning system, a service test system, a network activation system, or a combination thereof.

11. The method according to claim 8, further comprising executing the query, wherein the query complies with an xquery format.

12. The method according to claim 11, further comprising sending the command to a component of the service provider network based upon the executed query.

13. The method according to claim 8, wherein the command is sent to a network management system, a provisioning system, a service test system, a network activation system, or a combination thereof.

14. The method according to claim 8, further comprising:
   posing one or more questions to the user; and
   analyzing the service inquiry based upon answers received from the user in response to the questions during the robotic chat session.

15. A method comprising:
   establishing a robotic chat session with a chat-enabled device;
   receiving a service inquiry over the robotic chat session, wherein the service inquiry is associated with a service provider network;
   prompting a user of the chat-enabled device by posing one or more questions to the user regarding the service inquiry;

determining whether one of a plurality of flow definitions stored in a first database corresponds to the service inquiry for resolving the service inquiry exists, wherein the first database is configured to store the plurality of flow definitions that relate to a plurality of service inquiries, a second database is configured to store a plurality of queries associated with the plurality of flow definitions, the flow definitions comprise logic connecting client steps and server steps corresponding to troubleshooting scenarios for the plurality of service inquires, and the chat-enabled device comprises a client;

creating a new flow definition and an associated query if no corresponding flow definition exists;

storing the new flow definition in the first database and storing the associated query in the second database;

once an entirety of the new flow definition has been navigated, retrieving the associated query from the second database;

executing the associated query to output a command; and transmitting the command to a component of the service provider network to resolve the service inquiry wherein any function regarding a service inquiry is available to define a step-by-step flow definition.

16. The method according to claim 15, further comprising:

monitoring one or more components of the service provider network; and gathering information regarding a customer network based on the service inquiry.

17. The method according to claim 16, wherein the one or more components monitored include a network management system, a provisioning system, a service test system, a network activation system, or a combination thereof.

18. The method according to claim 15, wherein the query is generated according to a structured query language (SQL) including XQuery.

* * * * *